United States Patent
Ho et al.

(10) Patent No.: US 8,655,183 B2
(45) Date of Patent: Feb. 18, 2014

(54) OPTICAL TRANSCEIVER THAT MAINTAINS A BEND DIAMETER OF AN INTERNAL OPTICAL FIBER AND METHOD OF ASSEMBLING SAME

(75) Inventors: I-Lung Ho, Missouri City, TX (US); Alvin T. Herrera, Houston, TX (US); Yi Wang, Katy, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 355 days.

(21) Appl. No.: 13/208,576

(22) Filed: Aug. 12, 2011

(65) Prior Publication Data

US 2013/0039660 A1 Feb. 14, 2013

(51) Int. Cl.
*H04B 10/00* (2013.01)
*H04B 10/12* (2011.01)
(52) U.S. Cl.
USPC .................. 398/139; 398/135; 398/138
(58) Field of Classification Search
USPC ................................... 398/135–139
See application file for complete search history.

(56) References Cited

U.S. PATENT DOCUMENTS

| | | | |
|---|---|---|---|
| 6,334,716 B1 * | 1/2002 | Ojima et al. | 385/89 |
| 7,578,624 B2 * | 8/2009 | Scheibenreif et al. | 385/88 |
| 7,785,020 B2 * | 8/2010 | Kim et al. | 385/92 |
| 2007/0058919 A1 * | 3/2007 | Desanti | 385/135 |
| 2012/0219262 A1 * | 8/2012 | Hendrix et al. | 385/135 |
| 2012/0257861 A1 * | 10/2012 | Kang et al. | 385/91 |

\* cited by examiner

*Primary Examiner* — Daniel Dobson
(74) *Attorney, Agent, or Firm* — Grossman Tucker Perreault & Pfleger, PLLC; Norman S. Kinsella

(57) ABSTRACT

An optical transceiver includes an internal optical fiber coupled to optical sub-assemblies in the transceiver and is capable of maintaining a bend diameter of the internal optical fiber above a minimum bend diameter. The optical transceiver thus allows optical fiber to be used within a relatively small space within a housing of the optical transceiver without significant power loss in the optical signal carried on the optical fiber. The optical transceiver may be a small form-factor pluggable (SFP) transceiver used, for example, in an optical line terminal (OLT) and/or optical networking unit (ONU) in a wavelength division multiplexed (WDM) passive optical network (PON).

21 Claims, 3 Drawing Sheets

OPTICAL TRANSCEIVER THAT MAINTAINS A BEND DIAMETER OF AN INTERNAL OPTICAL FIBER AND METHOD OF ASSEMBLING SAME

TECHNICAL FIELD

The present invention relates to optical transceivers and more particularly, to an optical transceiver that maintains a bend diameter of an internal optical fiber above a minimum bend diameter and a method of assembling same.

BACKGROUND INFORMATION

Optical transceivers are generally used to transmit and receive optical signals in an optical communication system or network. Optical transceivers may transmit and receive optical signals at different wavelengths using wavelength divisional multiplexing (WDM) techniques. In a passive optical network (PON), for example, an optical networking unit (ONU) may include an optical transceiver transmitting optical signals at wavelengths in the C-band and receiving optical signals at wavelengths in the L-band. The optical transceiver contains the optical and electronic modules, components and sub-assemblies receive and transmit the optical signals and to convert between optical and electronic signals.

An optical transceiver may be coupled to an optical fiber for carrying the optical signals transmitted from and received by the transceiver. An optical transceiver may also include an internal optical fiber inside of the transceiver housing to facilitate optical coupling between optical sub-assemblies located within the transceiver. The optical fiber may be used, for example, to link transmitter and receiver sides of the transceiver.

In certain optical transceivers, however, the space within the transceiver housing is significantly limited. To comply with the small form-factor pluggable (SFP) transceiver standard, for example, the inside width of an SFP optical transceiver may be limited to about 10 mm. Using optical fiber within such a small space presents unique challenges. If the internal optical fiber is bent beyond a certain bending diameter, the optical fiber may be damaged and/or signal power may be lost, thereby adversely affecting performance. Although low bend loss optical fiber has been developed, bending the low bend loss optical fiber below a minimum bend diameter may still result in significant power loss.

BRIEF DESCRIPTION OF THE DRAWINGS

These and other features and advantages will be better understood by reading the following detailed description, taken together with the drawings wherein.

DETAILED DESCRIPTION

An optical transceiver, consistent with embodiments described herein, includes an internal optical fiber coupled to optical sub-assemblies in the transceiver and is capable of maintaining a bend diameter of the internal optical fiber above a minimum bend diameter. The optical transceiver thus allows optical fiber to be used within a relatively small space within a housing of the optical transceiver without significant power loss in the optical signal carried on the optical fiber. The optical transceiver may be a small form-factor pluggable (SFP) transceiver used, for example, in an optical line terminal (OLT) and/or optical networking unit (ONU) in a wavelength division multiplexed (WDM) passive optical network (PON) capable of transmitting and receiving optical signals on multiple channel wavelengths.

As used herein, channel wavelengths refer to the wavelengths associated with multiple optical channels and may include a range of wavelengths centered on a carrier wavelength associate with a channel. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

Figure 1:
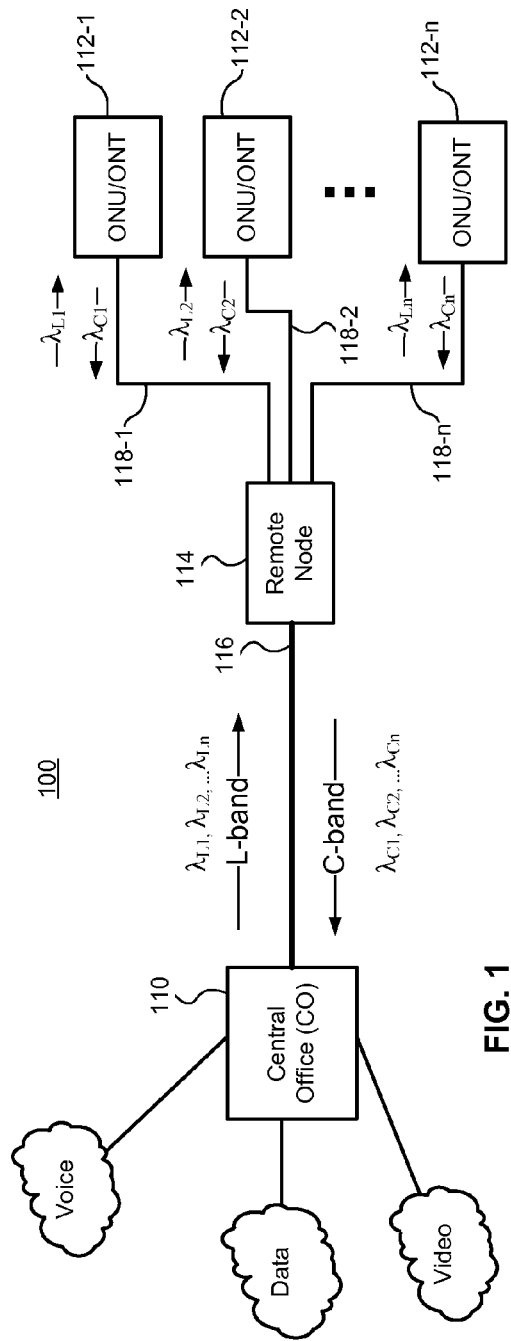
FIG. 1 is a functional block diagram of an optical network with terminals including transceivers, consistent with embodiments of the present invention.

Referring to FIG. 1, an optical transceiver, consistent with embodiments of the present invention, may be used with a WDM-PON 100. According to one embodiment of the WDM-PON 100, a central office (CO) 110 may be coupled to a plurality of ONUs/ONTs 112-1 to 112-n via optical waveguides or fibers 116, 118-1 to 118-n and a passive remote node 114. The ONUs/ONTs 112-1 to 112-n may be located in a home, business or other type of location or premises. The WDM-PON 100 may also include additional nodes or network devices, such as Ethernet PON (EPON) or Gigabit PON (GPON) nodes or devices, coupled between the remote node 114 and ONUs/ONTs at different locations or premises. One application of the WDM-PON 100 is to provide fiber-to-the-home (FTTH) or fiber-to-the-premises (FTTP) capable of delivering voice, data, and video services across a common platform. In this application, the CO 110 may be coupled to one or more sources or networks providing the voice, data and/or video.

In the WDM-PON 100, different ONUs/ONTs 112-1 to 112-n may be assigned different channel wavelengths and optical signals may be transmitted on the different channel wavelengths and combined and separated using WDM techniques. In one embodiment, the WDM-PON 100 may use different wavelength bands for transmission of downstream and upstream optical signals. For example, the L-band (e.g., about 1570 to 1600 nm) may be used for downstream transmissions and the C-band (e.g., about 1530 to 1560 nm) may be used for upstream transmissions. Other wavelengths and wavelength bands are also within the scope of the system and method described herein.

The ONUs/ONTs 112-1 to 112-n may be assigned different channel wavelengths within the L-band and within the C-band. Transceivers located within the ONUs/ONTs 112-1 to 112-n may thus be configured to transmit an optical signal on at least one channel wavelength in the C-band and to receive an optical signal on at least one channel wavelength in the L-band. The remote node 114 splits the downstream optical signal (e.g., $\lambda_{L1}, \lambda_{L2}, \ldots \lambda_{Ln}$) from the CO 110 for transmission to the respective ONUs/ONTs 112-1 to 112-n and combines the upstream optical signals (e.g., $\lambda_{C1}, \lambda_{C2}, \ldots \lambda_{Cn}$) from the respective ONUs/ONTs 112-1 to 112-n for transmission to the CO 110.

Figure 2:
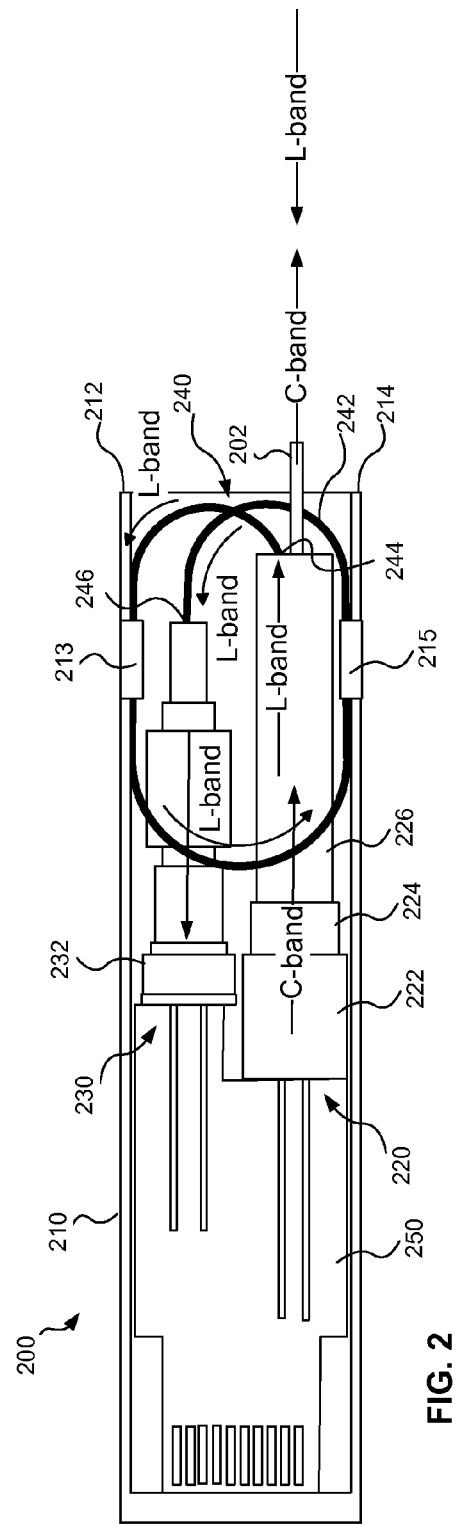
FIG. 2 is a schematic diagram of a transceiver including optical sub-assemblies coupled by an internal optical fiber with a bend diameter maintained above a minimum bend diameter, consistent with embodiments of the present invention.

Referring to FIG. 2, one embodiment of a transceiver 200 coupled to an optical fiber 202 for transmitting and receiving optical signals is described in greater detail. The transceiver may include a transceiver housing 210 containing a transmitter sub-assembly 220 for transmitting optical signals in the C-band and a receiver sub-assembly 230 for receiving optical signals in the L-band. The transceiver housing 210 may include walls 212, 214 for housing the transmitter sub-assembly 220, receiver sub-assembly 230, and other optical or electronic sub-assemblies, modules or components. In one embodiment, the transceiver 200 is an SFP transceiver compatible with a small form-factor pluggable (SFP) standard and the transceiver housing 210 has the dimensions required by the SFP specification.

The optical fiber 202 is coupled to the transmitter sub-assembly 220 in the transceiver 200 and carries the optical signals in both the C-band and L-band between the transceiver 200 and a WDM-PON. The transmitter sub-assembly 220 and the receiver sub-assembly 230 may be linked or coupled by an internal optical fiber 240 for carrying the received optical signals in the L-band from the transmitter sub-assembly 220 to the receiver sub-assembly 230. The internal optical fiber 240 may be located in a loose tube 242 at least partially coiled within the transceiver housing 210. The loose tube 242 forces the internal optical fiber 240 against the walls 212, 214 of the transceiver housing 210 such that the bend diameter of the optical fiber 240 is maintained above a minimum bend diameter while allowing the optical fiber 240 to fit within the relative small space between the walls 212, 214. In one embodiment, the minimum bend diameter of the optical fiber 240 is in a range of about 6-7 mm, the length of the optical fiber 240 is about 50 mm, and the internal width between the walls 212, 214 of the transceiver housing is about 10 mm. The loose tube 242 may be made of plastic or other flexible materials capable of forming a loop or coil within the housing 210 and may have a length about the same as the length of the optical fiber contained therein. One example of the loose tube 242 has a diameter of about 900 μm.

The transceiver housing 210 may include holding members, such as stepped portions 213, 215 extending from the respective walls 212, 214, for holding the loose tube 242 within the transceiver housing 210. Thus, the holding members allow the loose tube 242 to push the optical fiber to the widest possible extent within the transceiver housing 210. The holding members may be formed integrally with or separately from the housing 210. Although the holding members are shown as stepped portions 213, 215 extending from the respective walls 212, 214 in the illustrated embodiment, the holding portions may have other locations and configurations capable of holding the loose tube 242.

The transmitter sub-assembly 220 and the receiver sub-assembly 230 may be located within the housing 210 such that loose tube 242 maintains the bend diameter of the optical fiber 240 above the minimum bend diameter when respective ends 244, 246 of the optical fiber 240 are coupled to the transmitter sub-assembly 220 and the receiver sub-assembly 230. The transmitter sub-assembly 220 may include a laser module 222, a WDM module 224, and a reflect port 226 coupled to the optical fiber 202. The laser module 222 may be a TO can laser package including a laser diode, such as distributed feedback (DFB) laser or a Fabry-Perot (FP) laser.

The receiver sub-assembly 230 may include an optical detector module 232 including a photodetector, such as an avalanche photodiode (APD) with a trans-impedance amplifier (TIA) or other type of photodiode. The transceiver 200 may also include a circuit board 250 with circuitry coupled to the laser module 222 and the optical detector module 232.

The optical fiber 202 carries optical signals in the C-band transmitted by the transceiver 200 to a WDM-PON and carries optical signals in the L-band from the WDM-PON to the transceiver 200. The optical signals in the C-band are passed from the laser package 222 through the WDM module 224 to the optical fiber 202. The optical signals in the L-band are received from the optical fiber 202 and reflected by the WDM module 224 through the reflector port 226 to the receiver sub-assembly 230 for detection by the optical detector module 232. In particular, the reflected optical signals in the L-band enter the internal optical fiber 240 at one end 244 and exit the internal optical fiber 240 at the other end 246 into the receiver sub-assembly 230. Although the illustrated embodiment shows transmitter and receiver sub-assemblies coupled by the internal optical fiber, an internal optical fiber with a loose tube may also be used to couple other optical sub-assemblies within a transceiver or other optical device.

Figure 3A:
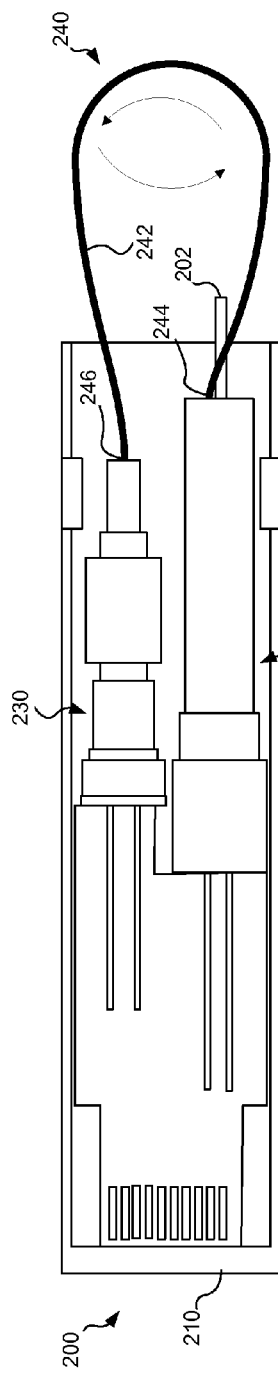
FIGS. 3A-3C are schematic diagrams illustrating a method of assembling the optical transceiver shown in FIG. 2 to maintain the bend diameter of the internal optical fiber inside the transceiver, consistent with an embodiment of the present invention.
Figure 3B:
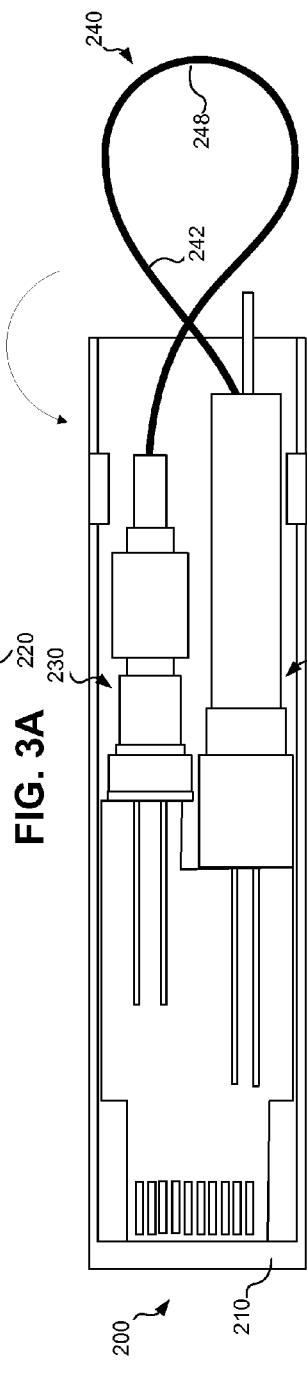
Figure 3C:
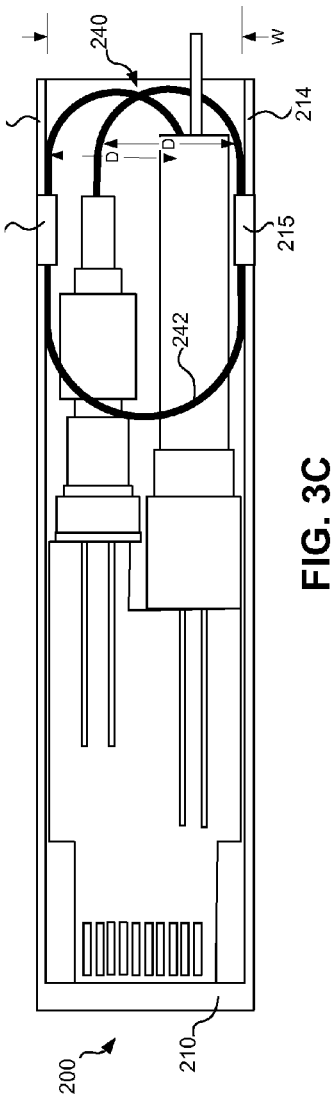

Referring to FIGS. 3A-3C, one method of assembling the optical transceiver 200 is described in greater detail. The optical fiber 240 is inserted or located within the loose tube 242 and the first and second ends 244, 246 of the optical fiber 240 are mechanically and optically coupled to the transmitter and receiver sub-assemblies 220, 230, respectively (FIG. 3A). The optical fiber 240 may be inserted into the loose tube 242 before either of the ends 244, 246 are coupled or after one of the ends 244, 246 is coupled. The loose tube 242 may also be mechanically coupled to the sub-assemblies 220, 230 at one or both ends. The optical fiber 240 may be coupled to the sub-assemblies 220, 230 either before or after the sub-assemblies 220, 230 are located within the transceiver housing 210. In one embodiment, the end 244 of the internal optical fiber 240 and the optical fiber 202 may be coupled to the transmitter sub-assembly 220 using a dual core fiber pigtail.

With the optical fiber 240 coupled to the sub-assemblies 220, 230, the curved end of the optical fiber 240 may be twisted (e.g., in the direction of the arrows) to form a loop 248 (FIG. 3B). The loop 248 may then be flipped or folded over toward the transceiver housing 210 (e.g., in the direction of the arrow) and inserted into the transceiver housing 210 such that the loose tube 242 containing the optical fiber 240 is at least partially coiled within the housing 210 (FIG. 3C). The loose tube 242 may be inserted such that the stepped portions 213, 215 or other holding members hold the loose tube 242 in place within the housing 210. The loose tube 242 pushes against the walls 212, 214 to maintain a fiber bend diameter D proximate the ends 244, 246 of the optical fiber 240 above a minimum bend diameter of the optical fiber 240 and within the relatively small width W between the walls 212, 214 of the housing 210.

Figure 4:
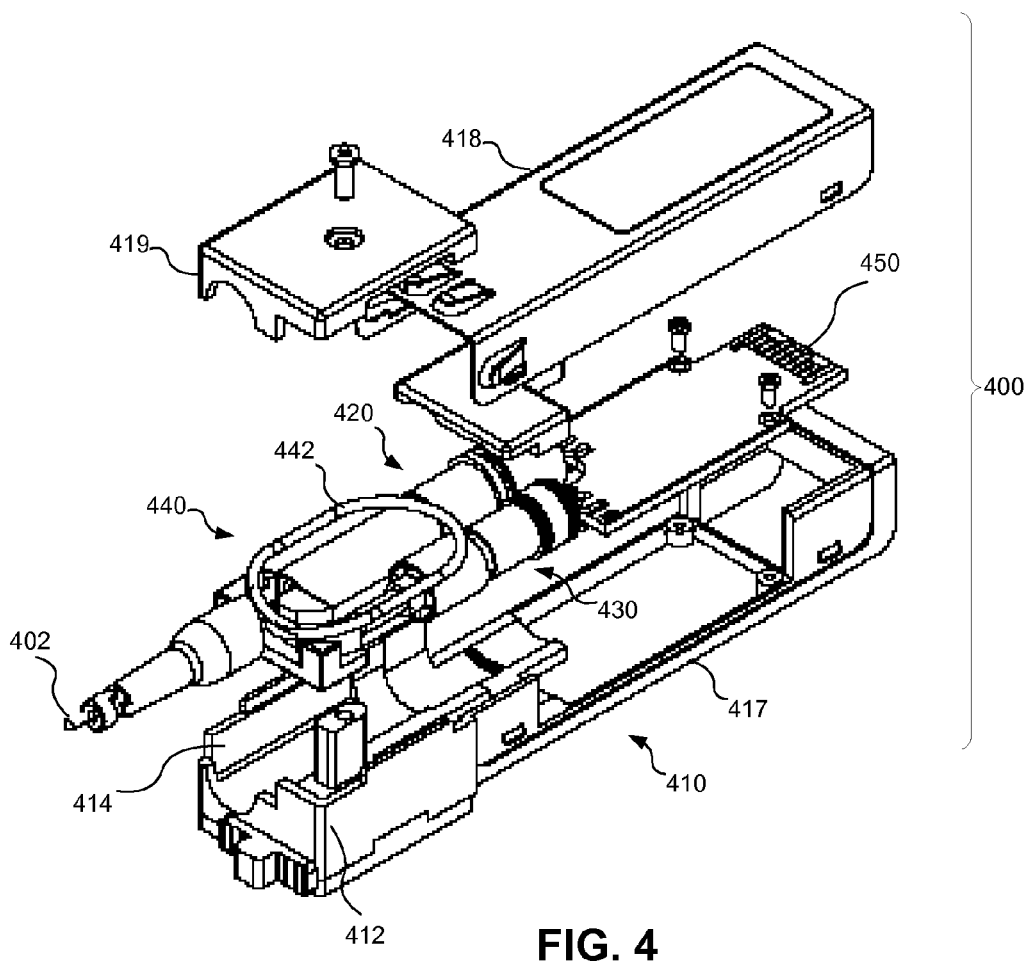
FIG. 4 is an exploded view of a transceiver including an internal optical fiber at least partially coiled with a bend diameter maintained above a minimum bend diameter, consistent with an embodiment of the present invention.
Figure 5:
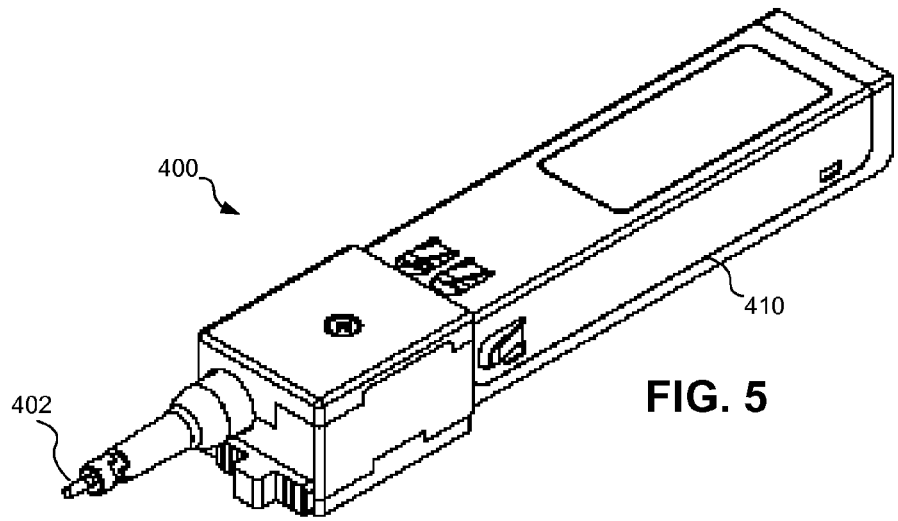
FIG. 5 is a perspective view of the transceiver shown in FIG. 4.

FIGS. 4 and 5 show another embodiment of an optical transceiver 400 that maintains a bend diameter of an internal optical fiber 440 above a minimum bend diameter. In this embodiment, the optical transceiver 400 includes a transceiver housing 410 with multiple housing components, such as a housing bottom 417, a housing top 418, and a housing cover 419. The transceiver housing 410 contains transmitter and receiver sub-assemblies 420, 430, an internal optical fiber 440 coupling the sub-assemblies 420, 430, and a circuit board 450 coupled to the sub-assemblies 420, 430. As described above, the internal optical fiber 440 is located within a loose tube 442, which is at least partially coiled and pushes the optical fiber 440 against walls 414, 412 of the housing 410 to maintain the bend diameter. An optical fiber 402 couples the transceiver 400 to a WDM-PON.

Accordingly, an optical transceiver and method of assembling an optical transceiver, consistent with embodiments described herein, allows an internal optical fiber to be used to couple optical sub-assemblies within a relatively small space and without damaging the internal optical fiber or causing significant signal power loss in the internal optical fiber.

Consistent with one embodiment, an optical transceiver includes a transceiver housing including walls and at least first and second optical sub-assemblies located in the transceiver housing. The optical transceiver further includes a loose tube extending between the optical sub-assemblies and an internal optical fiber located in the loose tube and coupled between the first and second optical sub-assemblies. The loose tube is at least partially coiled within the transceiver housing such that the loose tube pushes against the walls of the transceiver housing to maintain a fiber bend diameter of the internal optical fiber above a minimum bend diameter of the internal optical fiber.

Consistent with another embodiment, method is provided for assembling an optical transceiver. The method includes: locating an internal optical fiber within a loose tube; coupling first and second ends of the internal optical fiber to first and second optical sub-assemblies in a transceiver housing; twisting the loose tube containing the internal optical fiber to form a loop; and folding the loop over and into the transceiver housing such that the loose tube is at least partially coiled within the transceiver housing and the loose tube pushes against walls of the transceiver housing to maintain a fiber bend diameter of the internal optical fiber above a minimum bend diameter of the internal optical fiber.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical transceiver comprising:
   a transceiver housing including walls;
   at least first and second optical sub-assemblies located in the transceiver housing;
   a loose tube extending between the optical sub-assemblies;
   an internal optical fiber located in the loose tube and coupled between the first and second optical sub-assemblies, the loose tube being at least partially coiled within the transceiver housing such that the loose tube pushes against the walls of the transceiver housing to maintain a fiber bend diameter of the internal optical fiber above a minimum bend diameter of the internal optical fiber.

2. The optical transceiver of claim 1 wherein the transceiver includes holding members to hold the loose tube within the transceiver housing.

3. The optical transceiver of claim 2 wherein the holding members include stepped portions extending from the walls of the transceiver housing.

4. The optical transceiver of claim 1 wherein the minimum bend diameter is in a range of about 6 mm to 7 mm.

5. The optical transceiver of claim 1 wherein the transceiver housing is compatible with a small form-factor pluggable (SFP) specification.

6. The optical transceiver of claim 1 wherein an inside width between the walls of the transceiver housing is about 10 mm.

7. The optical transceiver of claim 1 wherein the optical fiber have a length of about 50 mm.

8. The optical transceiver of claim 1 wherein the loose tube maintains a fiber bend diameter of the internal optical fiber between about 6 mm to 10 mm.

9. The optical transceiver of claim 1 wherein the first optical assembly includes an optical transmitter sub-assembly and wherein the second optical assembly includes an optical receiver sub-assembly.

10. The optical transceiver of claim 9 wherein the transmitter sub-assembly includes a WDM module configured to pass a transmitted channel wavelength transmitted by the transmitter sub-assembly and to reflect a received channel wavelength to the internal optical fiber coupling the transmitter sub-assembly to the receiver sub-assembly.

11. A method of assembling an optical transceiver, the method comprising:
    locating an internal optical fiber within a loose tube;
    coupling first and second ends of the internal optical fiber to first and second optical sub-assemblies in a transceiver housing;
    twisting the loose tube containing the internal optical fiber to form a loop; and
    folding the loop over and into the transceiver housing such that the loose tube is at least partially coiled within the transceiver housing and the loose tube pushes against walls of the transceiver housing to maintain a fiber bend diameter of the internal optical fiber above a minimum bend diameter of the internal optical fiber.

12. The method of claim 11 further comprising:
    securing the partially coiled loose tube using holding members within the transceiver housing.

13. The method of claim 11 wherein the minimum bend diameter is in a range of about 6 mm to 7 mm.

14. The method of claim 11 wherein the transceiver housing is compatible with a small form-factor pluggable (SFP) specification.

15. The method of claim 11 wherein an inside width between the walls of the transceiver housing is about 10 mm.

16. The method of claim 11 wherein the optical fiber have a length of about 50 mm.

17. The method of claim 11 wherein the loose tube maintains a fiber bend diameter of the internal optical fiber between about 6 mm to 10 mm.

18. The method of claim 11 wherein the first optical assembly includes an optical transmitter sub-assembly and wherein the second optical assembly includes an optical receiver sub-assembly.

19. The method of claim 18 wherein the transmitter sub-assembly includes a WDM module configured to pass a transmitted channel wavelength transmitted by the transmitter sub-assembly and to reflect a received channel wavelength to the internal optical fiber coupling the transmitter sub-assembly to the receiver sub-assembly.

20. A wavelength division multiplexed (WDM) passive optical network (PON) comprising:
    a plurality of terminals associated with different respective channel wavelengths and configured to transmit and receive optical signals on the different respective channel wavelengths, at least one of the plurality of terminals including an optical transceiver comprising:
    a transceiver housing including walls;
    at least first and second optical sub-assemblies located in the transceiver housing;

a loose tube extending between the optical sub-assemblies;

an internal optical fiber located in the loose tube and coupled between the first and second optical sub-assemblies, the loose tube being at least partially coiled within the transceiver housing such that the loose tube pushes against the walls of the transceiver housing to maintain a fiber bend diameter of the internal optical fiber above a minimum bend diameter of the internal optical fiber.

21. The WDM-PON of claim 20 comprising:

at least one central office configured to transmit and receive aggregate WDM optical signals including the channel wavelengths; and at least one remote node coupled between the central office and the plurality of terminals, the remote node being configured to combine the optical signals at the channel wavelengths and configured to separate the aggregate WDM optical signal.

* * * * *